United States Patent
Kim et al.

(10) Patent No.: US 9,503,204 B2
(45) Date of Patent: Nov. 22, 2016

(54) APPARATUS AND METHOD FOR CALIBRATING TRANSMISSION PATH

(71) Applicant: Electronics and Telecommunications Research Institute, Daejeon (KR)

(72) Inventors: Kwang Seon Kim, Daejeon (KR); Min Soo Kang, Daejeon (KR); Bong Su Kim, Daejeon (KR); Jung Bin Kim, Seoul (KR); Woo Jin Byun, Daejeon (KR); Mi Kyung Suk, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 14/976,496

(22) Filed: Dec. 21, 2015

(65) Prior Publication Data

US 2016/0191177 A1    Jun. 30, 2016

(30) Foreign Application Priority Data

Dec. 29, 2014 (KR) .................. 10-2014-0192520
Feb. 23, 2015 (KR) .................. 10-2015-0025056

(51) Int. Cl.
  *H04B 17/12*  (2015.01)
  *H04B 17/13*  (2015.01)

(52) U.S. Cl.
  CPC ............. *H04B 17/12* (2015.01); *H04B 17/13* (2015.01)

(58) Field of Classification Search
  CPC ........................ H04B 17/12; H04B 17/13
  USPC ................. 375/224, 260, 267, 295, 316
  See application file for complete search history.

(56) References Cited

U.S. PATENT DOCUMENTS

| 7,205,936 | B2 | 4/2007 | Park et al. | |
| 8,976,845 | B2* | 3/2015 | O'Keeffe | H01Q 3/267 |
| | | | | 375/219 |
| 2004/0048584 | A1* | 3/2004 | Vaidyanathan | H01Q 3/2605 |
| | | | | 455/103 |
| 2006/0073801 | A1* | 4/2006 | Wang | H04B 7/0857 |
| | | | | 455/226.1 |
| 2006/0133535 | A1 | 6/2006 | Jung et al. | |
| 2007/0129040 | A1* | 6/2007 | Adlerstein | G01S 7/032 |
| | | | | 455/260 |
| 2010/0093282 | A1* | 4/2010 | Martikkala | H04B 17/364 |
| | | | | 455/63.4 |

FOREIGN PATENT DOCUMENTS

| KR | 2008-0021194 A | 3/2008 |
| KR | 2013-0074085 A | 7/2013 |

* cited by examiner

*Primary Examiner* — Freshteh N Aghdam
(74) *Attorney, Agent, or Firm* — Nelson Mullins Riley & Scarborough LLP; Anthony A. Laurentano

(57) ABSTRACT

Provided is an apparatus for calibrating a transmission path, the apparatus including one or more couplers to separate, by one or more paths, one or more input signals input from an input terminal of one or more antennas, a power detector to detect amplitude of one or more path signals separated by the one or more paths, a power distributor to distribute any one of the one or more path signals, one or more mixers to mix a distribution signal distributed by the power distributor with the one or more path signals, a low-pass filter to remove a high-frequency component of a mixed signal mixed by the one or more mixers; and a voltage detector to detect amplitude of one or more filter pass signals with the high-frequency component removed.

16 Claims, 7 Drawing Sheets

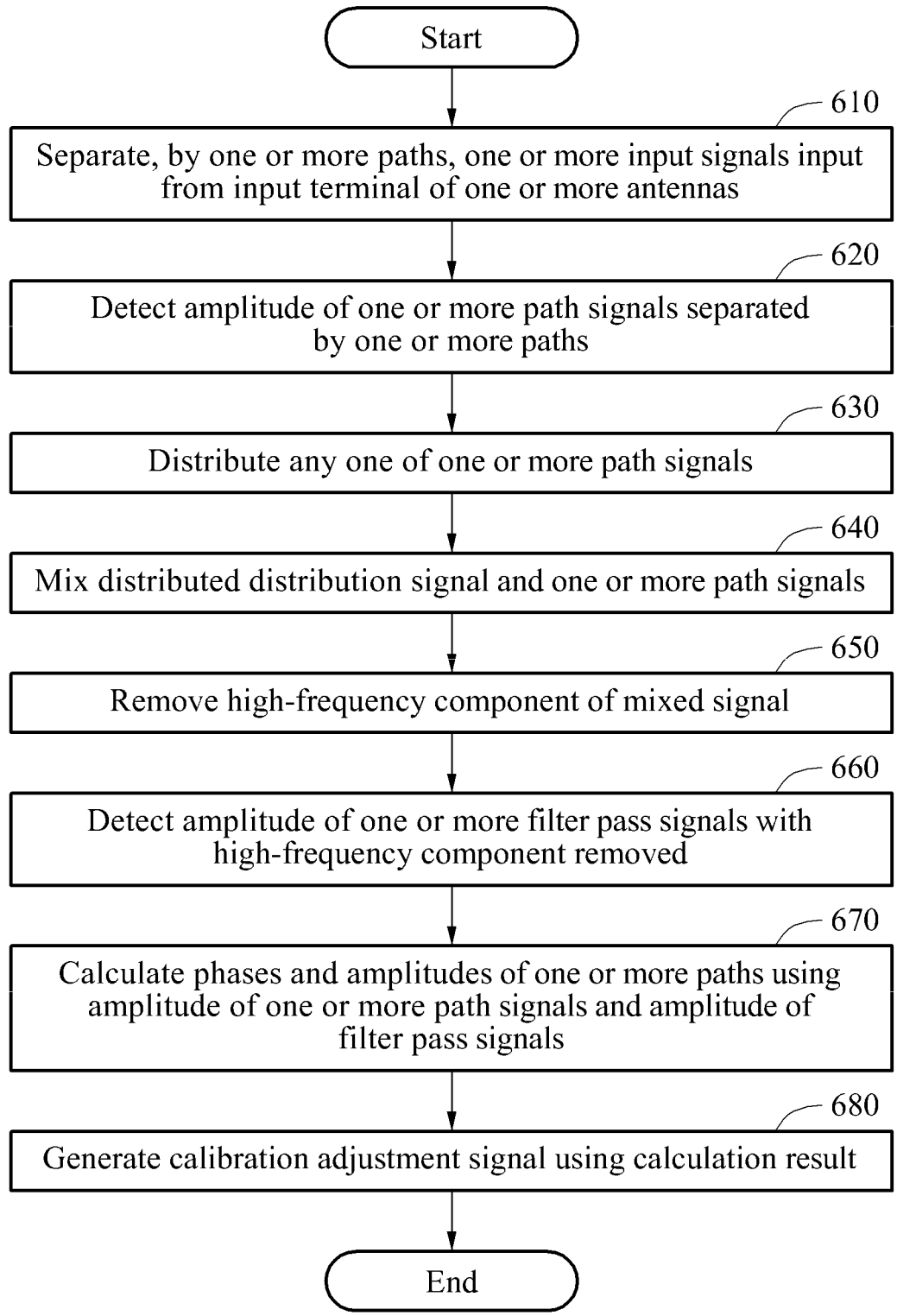

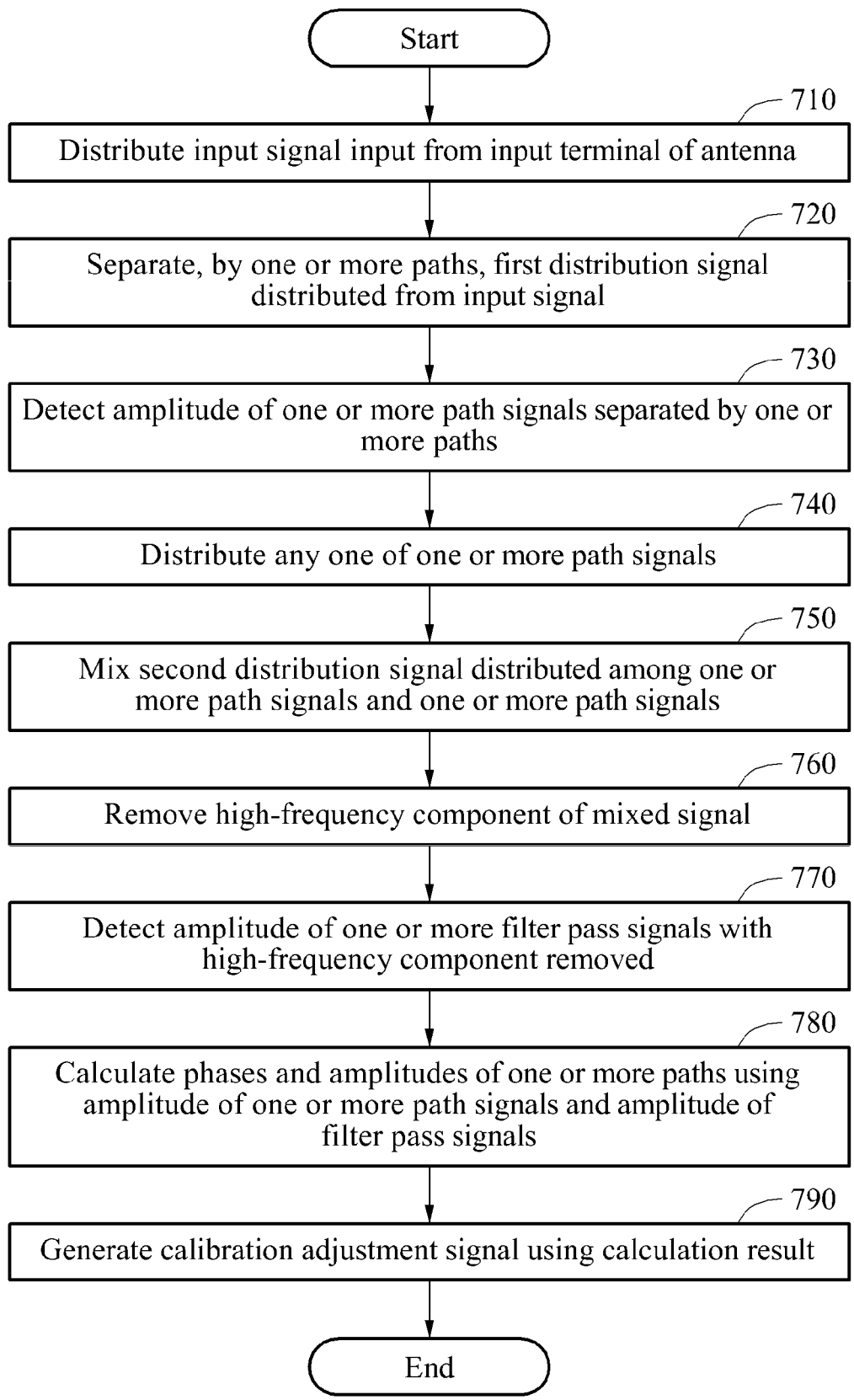

APPARATUS AND METHOD FOR CALIBRATING TRANSMISSION PATH

CROSS-REFERENCE TO RELATED APPLICATION

This application claims the priority benefit of Korean Patent Application No. 10-2014-0192520, filed on Dec. 29, 2014, and Korean Patent Application No. 10-2015-0025056, filed on Feb. 23, 2015, in the Korean Intellectual Property Office, the disclosures of which are incorporated herein by reference.

BACKGROUND

1. Field of the Invention

Example embodiments relate to a method and apparatus for calibrating a difference by transmission path in a wireless communication system which employs beamforming using an antenna array.

2. Description of the Related Art

In recent years, there is a dramatically growing demand for services which transmit and receive massive data, such as video and audio data, at high speed. Accordingly, studies are actively being conducted on use or spatial splitting of a high-frequency band, such as millimeter waves, to increase a transmission rate.

Beamforming using an antenna array is employed as a representative method in order to spatially collect wave signals.

A basic principle of beamforming is collecting signals in a desired direction to increase gain and offsetting signals in an undesired direction to reduce gain Use of beamforming increases transmission distance or reduces output power, thus enabling low-power operations and providing a spatial filter function which reduces surrounding interference signals.

As beamforming uses a plurality of antennas and radio frequency (RF) transceivers, it is necessary to calibrate differences between different antennas and between different RF transceivers in order to maintain stable performance.

Also, in a general beamforming technique, a reception path can be calibrated using a signal directly received by an antenna and thus is managed by a comparatively large number of methods. However, a transmission path does not directly receive a signal radiated by an antenna, making it difficult to calibrate a transmission signal.

Generally, beamforming has a complicate structure, which needs a reference signal for transmission path calibration and a receiver for receiving a signal, and has difficulty in performing continuous calibration during communications.

SUMMARY

According to an aspect, there is provided an apparatus for calibrating a transmission path, the apparatus including one or more couplers to separate, by one or more paths, one or more input signals input from an input terminal of one or more antennas, a power detector to detect amplitude of one or more path signals separated by the one or more paths, a power distributor to distribute any one of the one or more path signals, one or more mixers to mix a distribution signal distributed by the power distributor with the one or more path signals, a low-pass filter to remove a high-frequency component of a mixed signal mixed by the one or more mixers, and a voltage detector to detect amplitude of one or more filter pass signals with the high-frequency component removed.

The apparatus for calibrating a transmission path may further include a beamforming controller to calculate a phase and amplitude of the one or more paths using the amplitude of the one or more path signals and the amplitude of the filter pass signals and to generate a calibration adjustment signal using a calculation result.

The apparatus for calibrating a transmission path may further include one or more digital-to-analog (DA) converters to convert one or more output signals output from the beamforming controller into one or more analog signals, and one or more phase shifters to generate a phase of the one or more analog signals.

The one or more input signals may be one or more analog signals with a phase generated which are input from the one or more phase shifters.

The one or more mixers may mix the distribution signal and the one or more path signals to have a phase difference of 0 degrees or 90 degrees therebetween and IQ-mix the one or more path signals.

The power distributor may distribute distribution signals one fewer than number of the one or more paths to the one or more mixers.

According to another aspect, there is also provided an apparatus for calibrating a transmission path, the apparatus including one or more switches to separate, by one or more paths, one or more input signals input from an input terminal of one or more antennas, a power detector to detect amplitude of one or more path signals separated by the one or more paths, a power distributor to distribute any one of the one or more path signals, one or more mixers to mix a distribution signal distributed by the power distributor with the one or more path signals, a low-pass filter to remove a high-frequency component of a mixed signal mixed by the one or more mixers, and a voltage detector to detect amplitude of one or more filter pass signals with the high-frequency component removed.

According to still another aspect, there is also provided an apparatus for calibrating a transmission path, the apparatus including a first power distributor to distribute an input signal input from an input terminal of an antenna, one or more couplers to separate, by one or more paths, a first distribution signal distributed by the first power distributor, a power detector to detect amplitude of one or more path signals separated by the one or more paths, a second power distributor to distribute any one of the one or more path signals, one or more mixers to mix a second distribution signal distributed by the second power distributor with the one or more path signals, a low-pass filter to remove a high-frequency component of a mixed signal mixed by the one or more mixers, and a voltage detector to detect amplitude of one or more filter pass signals with the high-frequency component removed.

The apparatus for calibrating a transmission path may further include a beamforming controller to calculate a phase and amplitude of the one or more paths using the amplitude of the one or more path signals and the amplitude of the filter pass signals and to generate a calibration adjustment signal using a calculation result.

The apparatus for calibrating a transmission path may further include a modem to receive the calibration adjustment signal from the beamforming controller, one or more DA converters to convert one or more output signals output from the modem into one or more analog signals, and one or more phase shifters to generate a phase of the one or more analog signals.

According to yet another aspect, there is also provided a method of calibrating a transmission path, the method including separating, by one or more paths, one or more input signals input from an input terminal of one or more antennas, detecting amplitude of one or more path signals separated by the one or more paths, distributing any one of the one or more path signals, mixing a distributed distribution signal with the one or more path signals, removing a high-frequency component of a mixed signal mixed by the one or more mixers, and detecting amplitude of one or more filter pass signals with the high-frequency component removed.

The method of calibrating a transmission path may further include calculating a phase and amplitude of the one or more paths using the amplitude of the one or more path signals and the amplitude of the filter pass signals, and generating a calibration adjustment signal using a calculation result.

The method of calibrating a transmission path may further include converting one or more output signals into one or more analog signals, and generating a phase of the one or more analog signals.

According to further another aspect, there is also provided a method of calibrating a transmission path, the method including distributing an input signal input from an input terminal of an antenna, separating, by one or more paths, a first distribution signal distributed by from the input signal, detecting amplitude of one or more path signals separated by the one or more paths, distributing any one of the one or more path signals, mixing a second distribution signal distributed among the one or more path signals with the one or more path signals, removing a high-frequency component of a mixed signal, and detecting amplitude of one or more filter pass signals with the high-frequency component removed.

The method of calibrating a transmission path may further include calculating a phase and amplitude of the one or more paths using the amplitude of the one or more path signals and the amplitude of the filter pass signals, and generating a calibration adjustment signal using a calculation result.

The method of calibrating a transmission path may further include receiving the calibration adjustment signal, converting the calibration adjustment signal into one or more analog signals, and generating a phase of the one or more analog signals.

BRIEF DESCRIPTION OF THE DRAWINGS

These and/or other aspects, features, and advantages of the disclosure will become apparent and more readily appreciated from the following description of exemplary embodiments, taken in conjunction with the accompanying drawings of which:

FIG. 6 is a flowchart illustrating an example of a method of calibrating a transmission path according to an example embodiment; and FIG. 7 is a flowchart illustrating another example of a method of calibrating a transmission path according to an example embodiment.

DETAILED DESCRIPTION

Figure 1:
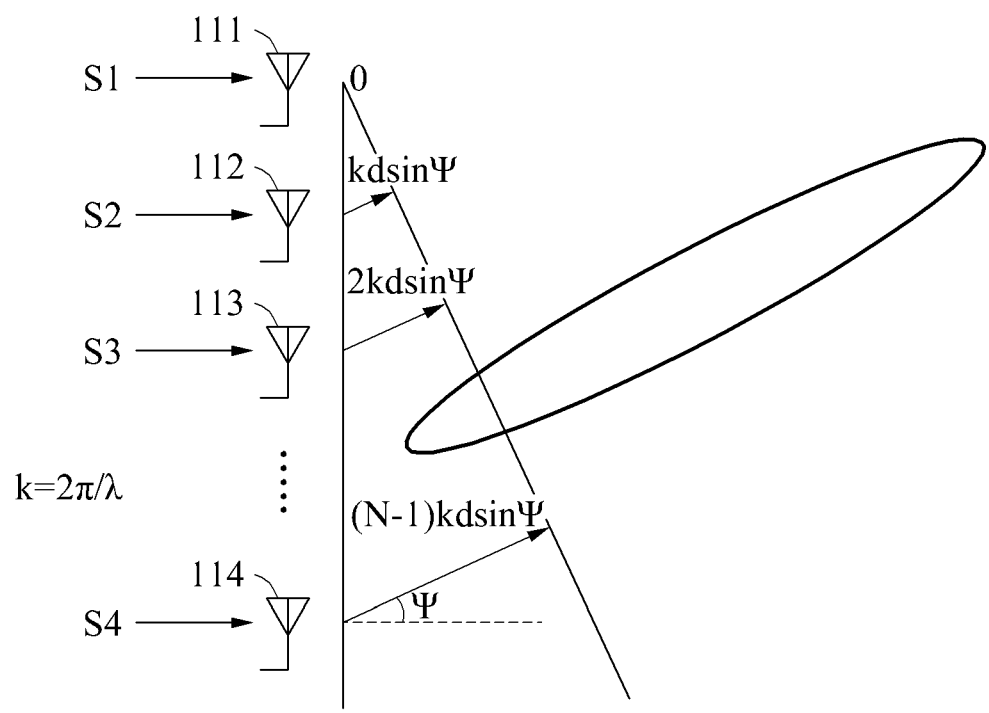
FIG. 1 illustrates a principle of beamforming using an antenna array according to an example embodiment.

Hereinafter, although example embodiments will be described in detail with reference to the accompanying drawings, the present disclosure is not limited or restricted to the example embodiments.

The following example embodiments may be modified variously. The following example embodiments are not intended to limit the present disclosure but are construed as including all changes, equivalents and substitutions thereof.

The terminology used herein is for the purpose of describing particular example embodiments only and is not intended to limit the example embodiments. As used herein, the singular forms are intended to include the plural forms as well, unless the context clearly indicates otherwise. It will be further understood that the terms "include" and/or "have," when used in this specification, specify the presence of stated features, integers, steps, operations, elements, components or combinations thereof, but do not preclude the presence or addition of one or more other features, integers, steps, operations, elements, components, or combinations thereof.

When it is determined detailed description related to a related known function or configuration they may make the purpose of the present disclosure unnecessarily ambiguous in describing the present disclosure, the detailed description will be omitted here. Also, terms used herein are defined to appropriately describe the example embodiments and thus may be changed depending on a user, the intent of an operator, or a custom. Accordingly, the terms must be defined based on the following overall description of this specification.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the description with reference to the accompanying drawings, like reference numerals denote like elements, and descriptions thereof will be omitted. When it is determined detailed description related to a related known technology may make the gist of the present disclosure unnecessarily ambiguous in describing the present disclosure, the detailed description will be omitted here.

FIG. 1 illustrates a principle of beamforming using an antenna array according to an example embodiment.

Referring to FIG. 1, according to the principle of beamforming, defining a desired direction of a desired antenna beam as $\psi$, each of antennas 111, 112, 113 and 114 of an antenna array may be allowed to have a certain delayed length which is a multiple of $kd\sin\psi$ so that constructive interference occurs in the desired direction.

Such a delay may change a phase of a signal by a phase, calculated in view of propagation speed, using a phase shifter. Here, a phase of the phase shifter may be obtained by Equation 1.

$$\phi = \frac{2\pi}{\lambda} d \sin\psi \qquad \text{[Equation 1]}$$

Signals transmitted from the respective antennas 111, 112, 113 and 114 may be the same signals with different phases only since the same phase is added thereto.

Figure 2:
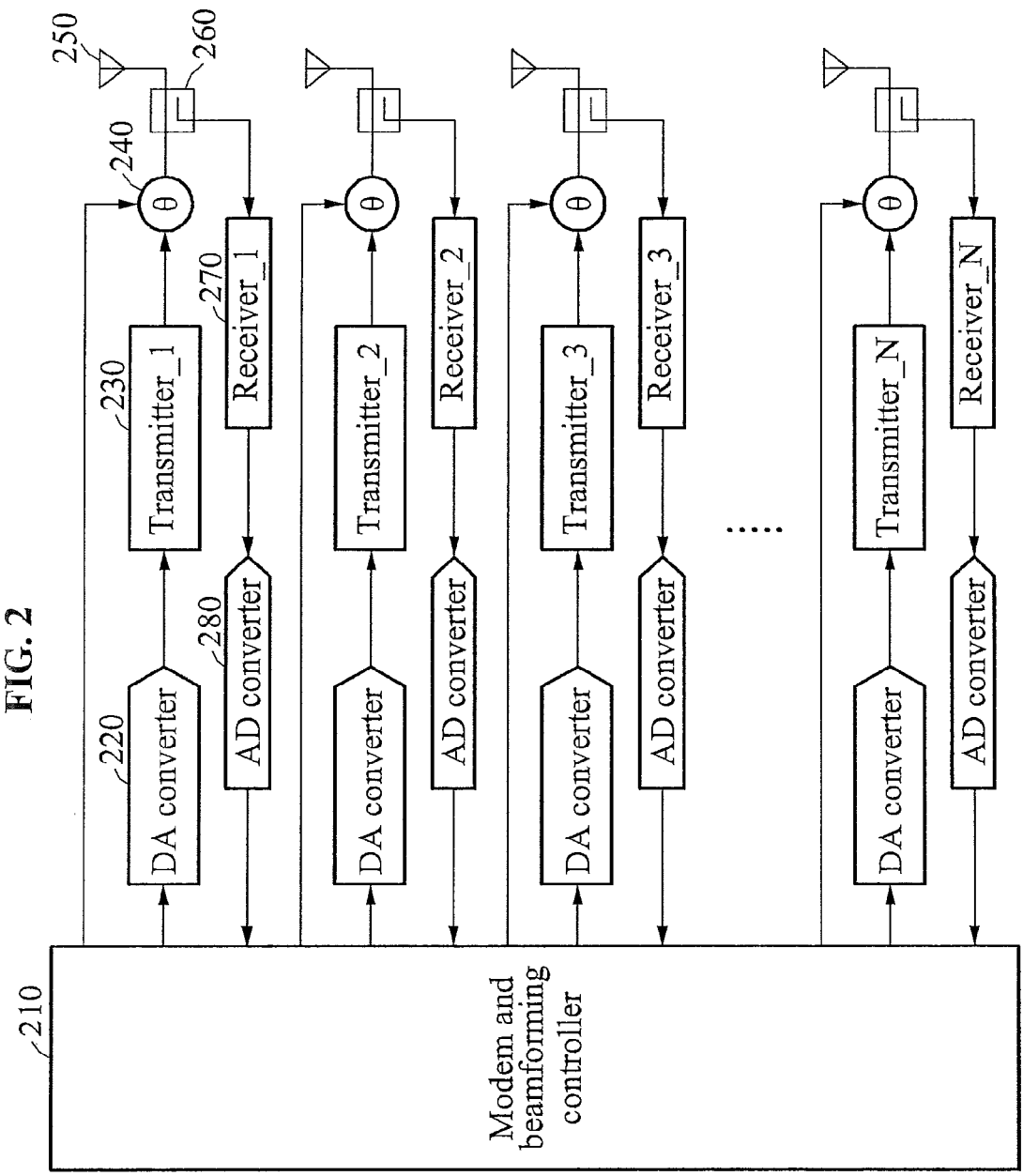
FIG. 2 is a block diagram illustrating an apparatus for calibrating a transmission path of a wireless communication system using a general antenna array.

FIG. 2 is a block diagram illustrating an apparatus for calibrating a transmission path of a wireless communication system using a general antenna array.

Referring to FIG. 2, the apparatus for calibrating the transmission path (also referred to as the "transmission path calibration apparatus") may convert a signal output from a modem and beamforming controller 210 into an analog signal using a digital-to-analog (DA) converter 220 and up-convert the analog signal through a transmission path of each transmitter 230.

The transmission path calibration apparatus may generate a desired phase with respect to the up-converted signal using each phase shifter 240 and radiate the signal through each antenna 250.

The transmission path calibration apparatus may separate a signal of each transmission path using a coupler or switch 260 at a front end of an antenna for transmission beamforming calibration and down-convert the separated signal using each receiver 270.

The transmission path calibration apparatus may convert the down-converted signal into a digital signal through an analog-to-digital (AD) converter 280 to feed back the signal to the modem and beamforming controller 210.

The modem and beamforming controller 210 may compare the transmitted signal and the fed-back signal to determine whether a phase of each transmitter 230 is accurate, calibrate the signal using the phase shifter 240 or autonomously calibrate the signal, and transmit the calibrated signal through each antenna 250.

Generally, the transmission path calibration apparatus needs a reference signal in order to additionally calibrate performance of the receiver 270 and may sequentially receive signals by switching some paths to reduce number of reception paths.

Figure 3:
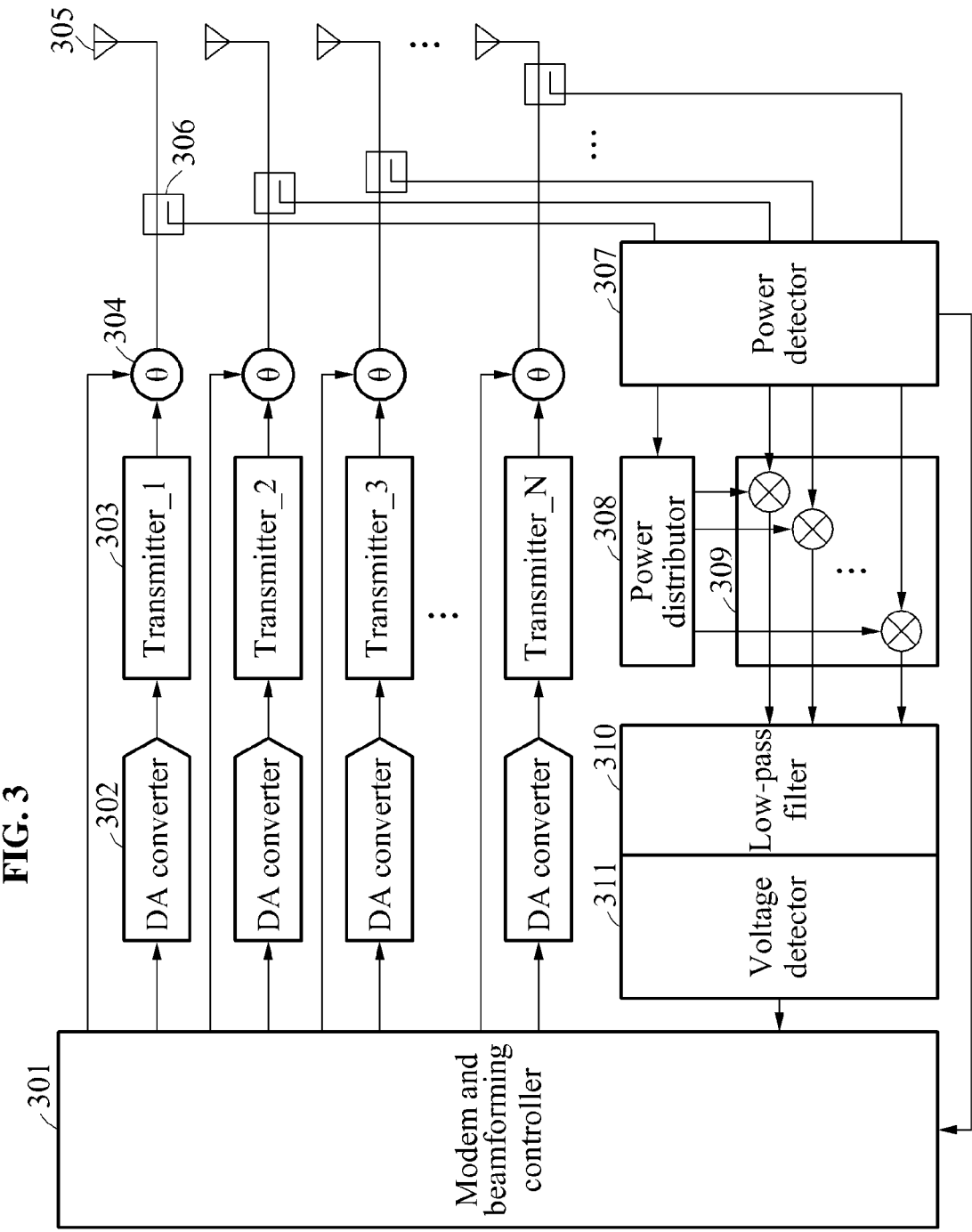
FIG. 3 is a block diagram illustrating an example of an apparatus for calibrating a transmission path according to an example embodiment.

FIG. 3 is a block diagram illustrating an example of an apparatus for calibrating a transmission path according to an example embodiment.

Referring to FIG. 3, the transmission path calibration apparatus includes one or more couplers 306, a power detector 307, a power distributor 308, one or more mixers 309, a low-pass filter 310 and a voltage detector 311.

According to an example embodiment, the transmission path calibration apparatus may be configured to include a switch instead of the one or more couplers 306 which separate, by one or more paths, one or more input signals input from an input terminal of one or more antennas.

The transmission path calibration apparatus may further include a modem 301, one or more DA converters 302, one or more transmitters 303 and one or more phase shifters 304.

The transmission path calibration apparatus may convert a signal output from the modem 301 into an along signal using the DA converter 302 and up-convert the analog signal through a transmission path of each transmitter 303.

For instance, the one or more DA converters 302 may convert one or more output signals output from the beamforming controller 301 into one or more analog signals, and the one or more phase shifters 304 may generate a phase with respect to the one or more analog signals.

Here, the one or more input signals may be one or more analog signals with a phase generated which are input from the one or more phase shifters 304.

The transmission path calibration apparatus may generate a desired phase with respect to the up-converted signal using each phase shifter 303 and radiates the signal through each antenna 250.

The one or more couplers 306 separate, by one or more paths, one or more input signals input from an input terminal of the one or more antennas 305.

The power detector 307 detects amplitude of one or more path signals separated by one or more paths.

The power distributor 308 distributes any one of the one or more path signals. For example, the power distributor 308 may distribute distribution signals one fewer than number of one or more paths to the one or more mixers 309.

The one or more mixers 309 mix the distribution signals distributed by the power distributor 308 and the one or more path signals.

For example, the one or more mixers 309 may mix the distribution signals and the one or more path signals to have a phase difference of 0 degrees or 90 degrees and IQ-mix each of the one or more path signals.

The low-pass filter 310 removes a high-frequency component of a mixed signal mixed by the one or more mixers 309.

The voltage detector 311 detects amplitude of one or more filter pass signals with a high-frequency component removed.

The transmission path calibration apparatus according to an example embodiment may further include a beamforming controller 301, and the beamforming controller 301 may be configured to be integrated with the modem 301 as in FIG. 3 or be configured separately.

The beamforming controller 301 may calculate phases and amplitudes of one or more paths using the amplitude of the one or more path signals and the amplitude of the filter pass signals and generate a calibration adjustment signal using a calculation result.

Hereinafter, a process of calculating phases and amplitudes of one or more paths using amplitude of one or more paths signals and amplitude of filter pass signals and generating a calibration adjustment signal using a calculation result according to an example embodiment will be described.

According to an example embodiment, when a first up-converted input signal from an antenna is defined as a reference signal ($S_1$), $S_1$ may be defined by Equation 2.

$$S_1 = a(t)\cos(wt) \qquad \text{[Equation 2]}$$

Further, input signals from one or more different antennas have the same signal form but different phases only and thus may be defined by Equation 3.

$$S_2 = a(t)\cos(\omega t + \theta_1)$$
$$S_3 = a(t)\cos(\omega t + \theta_2) \qquad \text{[Equation 3]}$$
$$\ldots$$
$$S_N = a(t)\cos(\omega t + \theta_{N-1})$$

The transmission path calibration apparatus may mix a distribution signal and one or more path signals using the one or more mixers 309. That is, the transmission path calibration apparatus may multiply a value of Equation 2 corresponding to a distribution signal and a value of Equation 3 corresponding to one or more path signals, thereby obtaining a value of a mixed signal (value of Equation 4).

$$S_1 \times S_2 = a(t)^2 \cos(\omega t)\cos(\omega t + \theta_1)$$ [Equation 4]

$$S_1 \times S_3 = a(t)^2 \cos(\omega t)\cos(\omega t + \theta_2)$$

$$\vdots$$

$$S_1 \times S_N = a(t)^2 \cos(\omega t)\cos(\omega t + \theta_{N-1})$$

The transmission path calibration apparatus passes the value of the mixed signal through the low-pass filter to remove a high-frequency component, thereby obtaining a value of Equation 5 corresponding to one or more filter pass signals.

$$S_1 \times S_2 = \frac{1}{2}a(t)^2 \{\cos\theta_1 + \cos(2\omega t + \theta_1)\}$$ [Equation 5]

$$S_1 \times S_3 = \frac{1}{2}a(t)^2 \{\cos\theta_2 + \cos(2\omega t + \theta_2)\}$$

$$\vdots$$

$$S_1 \times S_N =$$

$$\frac{1}{2}a(t)^2 \{\cos\theta_{N-1} + \cos(2\omega t + \theta_{N-1})\}$$

The transmission path calibration apparatus may divide the one or more filter pass signals according to level of power by each path measured by the power detector 307 to obtain a phase by each path using a value of a trigonometric function.

According to an example embodiment, the transmission path calibration apparatus may easily obtain a difference by each path using only amplitude information and adjust a phase by adjusting the phase shifters 304 with reference to the phase by each path.

According to an example embodiment, the transmission path calibration apparatus may more accurately calibrate the phase using a variable attenuator for each path.

According to an example embodiment, the transmission path calibration apparatus mixes input signals based on a signal input to an antenna and thus is capable of performing calibration without using a given reference signal and may not be subjected to characteristics of communication signal systems.

According to an example embodiment, the transmission path calibration apparatus is capable of performing continuous calibration in real time, making calibration within a short time possible.

Figure 4:
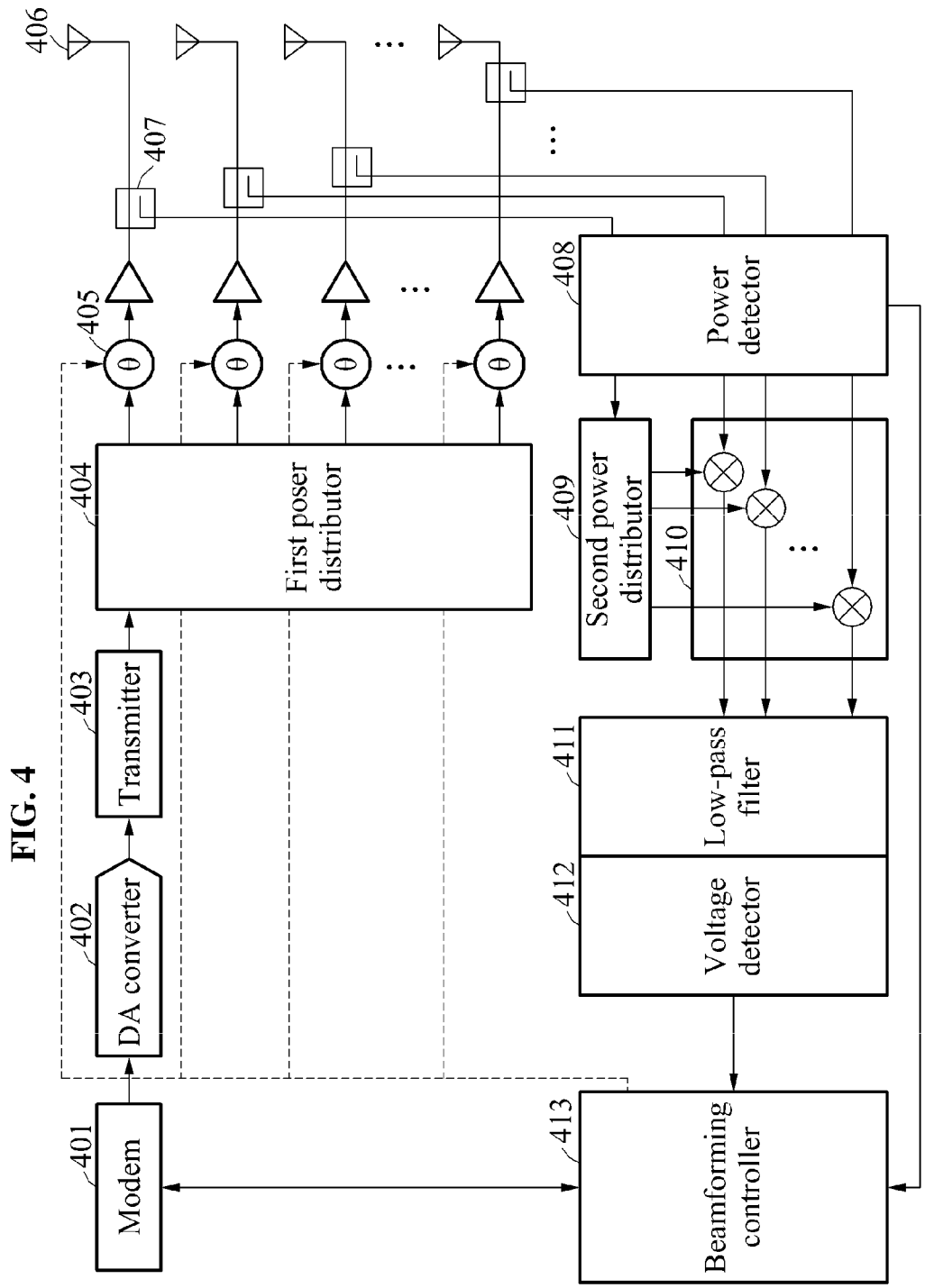
FIG. 4 is a block diagram illustrating another example of an apparatus for calibrating a transmission path according to an example embodiment.

FIG. 4 is a block diagram illustrating another example of an apparatus for calibrating a transmission path according to an example embodiment.

Referring to FIG. 4, the transmission path calibration apparatus may be an analog beamforming system structure which includes one transmitter 403 and a plurality of phase shifters 405 in a plurality of paths.

The transmission path calibration apparatus includes a first power distributor 404, one or more couplers 407, a power detector 408, a second power distributor 409, one or more mixers 410, a low-pass filter 411 and a voltage detector 412.

The transmission path calibration apparatus may further include a modem 401, one or more DA converters 402 and one or more phase shifters 405.

The modem 401 receives a calibration adjustment signal from a beamforming controller 413, and the DA converters 402 may convert one or more output signals output from the modem 401 into one or more analog signals. Here, the one or more phase shifters 405 may generate a phase with respect to the one or more analog signals.

The first power distributor 404 distributes input signals input from an input terminal of an antenna 406.

The one or more couplers 407 separate, by one or more paths, a first distribution signal distributed by the first power distributor 404.

The power detector 408 may detect amplitude of one or more path signals separated by one or more paths.

The second power distributor 409 distributes any one of the one or more path signals. The one or more mixers 410 mix a second distribution signal distributed by the second power distributor 409 and the one or more path signals.

The low-pass filter 411 removes a high-frequency component of a mixed signal mixed by the one or more mixers 410.

The voltage detector 412 detects amplitude of one or more filter pass signals with a high-frequency component removed.

The transmission path calibration apparatus may further include the beamforming controller 413, and the beamforming controller 413 may be configured separately from the modem 401 as in FIG. 4 or be configured to be integrated therewith.

The beamforming controller 413 may calculate phases and amplitudes of one or more paths using the amplitude of the one or more path signals and the amplitude of the filter pass signals and generate a calibration adjustment signal using a calculation result.

In an example, the transmission path calibration apparatus may be in a digital beamforming system structure which includes a modem having a phase shift function.

Figure 5:
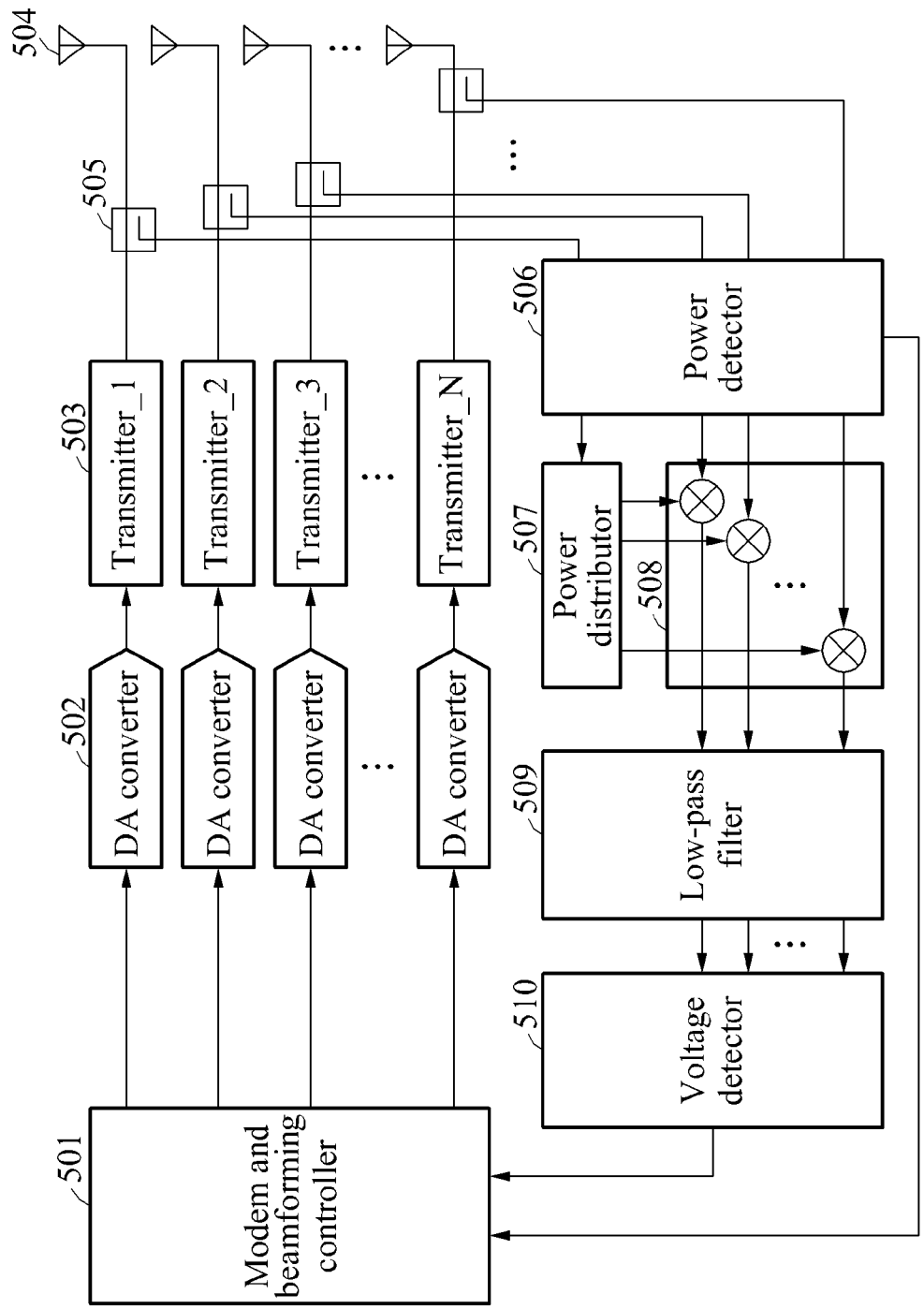
FIG. 5 is a block diagram illustrating still another example of an apparatus for calibrating a transmission path according to an example embodiment.

FIG. 5 is a block diagram illustrating a still another example of an apparatus for calibrating a transmission path according to an example embodiment.

Referring to FIG. 5, the transmission path calibration may include a modem and beamforming controller 501, one or more DA converters 502, one or more transmitters 503, one or more couplers 505, a power detector 506, a power distributor 507, one or more mixers 508, a low-pass filter 509 and a voltage detector 510.

The modem and beamforming controller 501 is a digital system having a phase shift function and may distribute and transmit a digital signal with a phase generated to the DA converters 502.

The transmission path calibration apparatus may convert the signal distributed by the modem and beamforming controller 501 into an along signal using the DA converters 502 and up-convert the analog signal through a transmission path of each transmitter 503.

The one or more couplers 505 may separate, by one or more paths, one or more input signals input from an input terminal of one or more antennas 504.

The power detector 506 may detect amplitude of one or more path signals separated by one or more paths.

The power distributor 507 may distribute any one of the one or more path signals.

The one or more mixers 508 may mix a distribution signal distributed by the power distributor 507 and the one or more path signals.

The low-pass filter 509 may remove a high-frequency component of a mixed signal mixed by the one or more mixers 508.

The voltage detector 510 may detect amplitude of one or more filter pass signals with a high-frequency component removed.

The modem and beamforming controller 501 may calculate phases and amplitudes of one or more paths using the amplitude of the one or more path signals and the amplitude of the filter pass signals and generate a calibration adjustment signal using a calculation result.

Hereinafter, a method of calibrating a transmission path according to an example embodiment will be described. The method of calibrating the transmission method may be performed by the foregoing transmission path calibration apparatus and thus will be described from a viewpoint of the transmission path calibration apparatus.

FIG. 6 is a flowchart illustrating an example of a method of calibrating a transmission path according to an example embodiment.

First, the transmission path calibration apparatus may convert one or more output signals into one or more analog signals and generate a phase with respect to the one or more analog signals.

Referring to FIG. 6, the transmission path calibration apparatus separates, by one or more paths, one or more input signals input from an input terminal of one or more antennas in operation 610.

The transmission path calibration apparatus detects amplitude of one or more path signals separated by one or more paths in operation 620.

The transmission path calibration apparatus distributes any one of the one or more path signals in operation 630.

The transmission path calibration apparatus mixes a distributed distribution signal and the one or more path signals in operation 640.

The transmission path calibration apparatus removes a high-frequency component of a mixed signal in operation 650.

The transmission path calibration apparatus detects amplitude of one or more filter pass signals with a high-frequency component removed in operation 660.

The transmission path calibration apparatus may calculate phases and amplitudes of one or more paths using the amplitude of the one or more path signals and the amplitude of the filter pass signals in operation 670.

The transmission path calibration apparatus may generate a calibration adjustment signal using a calculation result in operation 680.

Hereinafter, a method of calibrating a transmission path will be described based on another example. The method of calibrating the transmission method may be performed by the foregoing transmission path calibration apparatus and thus will be described from a viewpoint of the transmission path calibration apparatus.

FIG. 7 is a flowchart illustrating another example of a method of calibrating a transmission path according to an example embodiment.

First, the transmission path calibration apparatus may convert one or more output signals into one or more analog signals and generate a phase with respect to the one or more analog signals.

Referring to FIG. 7, the transmission path calibration apparatus distributes an input signal input from an input terminal of an antenna in operation 710.

The transmission path calibration apparatus separates, by one or more paths, a first distribution signal distributed from the input signal in operation 720.

The transmission path calibration apparatus detects amplitude of one or more path signals separated by one or more paths in operation 730.

The transmission path calibration apparatus distributes any one of the one or more path signals in operation 740.

The transmission path calibration apparatus mixes a second distribution signal distributed among the one or more path signals and the one or more path signals in operation 750.

The transmission path calibration apparatus removes a high-frequency component of a mixed signal in operation 760.

The transmission path calibration apparatus detects amplitude of one or more filter pass signals with a high-frequency component removed in operation 770.

The transmission path calibration apparatus calculates phases and amplitudes of one or more paths using the amplitude of the one or more path signals and the amplitude of the filter pass signals in operation 780.

The transmission path calibration apparatus generates a calibration adjustment signal using a calculation result in operation 790.

The transmission path calibration apparatus may receive a calibration adjustment signal, convert the calibration adjustment signal into one or more analog signals, and generate a phase with respect to the one or more analog signals.

According to an example embodiment, phase and amplitude differences between antenna paths may be continuously detected and calibrated by applying a simple mixer and power detector based on a signal used for one antenna path.

According to an example embodiment, phase and amplitude differences by transmission path may be detected for transmission path calibration for an antenna array without using a reference signal.

According to an example embodiment, the apparatus and method have a simple structure to be applicable to any system and are capable of conducting continuous monitoring, thereby achieving a stable communication service under environmental changes and random errors.

The units described herein may be implemented using hardware components and software components. For example, the hardware components may include microphones, amplifiers, band-pass filters, audio to digital convertors, and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The methods according to the above-described examples may be realized as program instructions implemented by various computers and be recorded in non-transitory computer-readable media. The media may also include, alone or in combination with the program instructions, data files, data structures, and the like. The program instructions recorded in the media may be designed and configured specially for the embodiments or be known and available to those skilled in computer software. Examples of the non-transitory computer readable recording medium may include magnetic media such as hard disks, floppy disks, and magnetic tape; optical media such as CD ROM disks and DVDs; magneto-optical media such as floptical disks; and hardware devices that are specially configured to store and perform program instructions, such as read-only memory (ROM), random access memory (RAM), flash memory, and the like. Examples of program instructions include both machine codes, such as produced by a compiler, and higher level language codes that may be executed by the computer using an interpreter. The described hardware devices may be configured to act as one or more software modules in order to perform the operations of the above-described exemplary embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits are combined or coupled in different forms and modes than as described above or be substituted or switched with other components or equivalents.

Thus, other implementations, alternative embodiments and equivalents to the claimed subject matter are construed as being within the appended claims.

What is claimed is:

1. An apparatus for calibrating a transmission path, the apparatus comprising:
   one or more couplers to separate, by one or more paths, one or more input signals input from an input terminal of one or more antennas;
   a power detector to detect amplitude of one or more path signals separated by the one or more paths;
   a power distributor to distribute any one of the one or more path signals;
   one or more mixers to mix a distribution signal distributed by the power distributor with the one or more path signals;
   a low-pass filter to remove a high-frequency component of a mixed signal mixed by the one or more mixers; and
   a voltage detector to detect amplitude of one or more filter pass signals with the high-frequency component removed.

2. The apparatus of claim 1, further comprising:
   a beamforming controller to calculate a phase and amplitude of the one or more paths using the amplitude of the one or more path signals and the amplitude of the filter pass signals and to generate a calibration adjustment signal using a calculation result.

3. The apparatus of claim 2, further comprising:
   one or more digital-to-analog (DA) converters to convert one or more output signals output from the beamforming controller into one or more analog signals; and
   one or more phase shifters to generate a phase of the one or more analog signals.

4. The apparatus of claim 3, wherein the one or more input signals are one or more analog signals with a phase generated which are input from the one or more phase shifters.

5. The apparatus of claim 1, wherein the one or more mixers mix the distribution signal and the one or more path signals to have a phase difference of 0 degrees or 90 degrees therebetween and IQ-mix the one or more path signals.

6. The apparatus of claim 1, wherein the power distributor distributes distribution signals one fewer than number of the one or more paths to the one or more mixers.

7. The apparatus of claim 1, further comprising:
   one or more switches to separate, by the one or more paths, the one or more input signals input from the input terminal of the one or more antennas.

8. An apparatus for calibrating a transmission path, the apparatus comprising:
   a first power distributor to distribute an input signal input from an input terminal of an antenna;
   one or more couplers to separate, by one or more paths, a first distribution signal distributed by the first power distributor;
   a power detector to detect amplitude of one or more path signals separated by the one or more paths;
   a second power distributor to distribute any one of the one or more path signals;
   one or more mixers to mix a second distribution signal distributed by the second power distributor with the one or more path signals;
   a low-pass filter to remove a high-frequency component of a mixed signal mixed by the one or more mixers; and
   a voltage detector to detect amplitude of one or more filter pass signals with the high-frequency component removed.

9. The apparatus of claim 8, further comprising:
   a beamforming controller to calculate a phase and amplitude of the one or more paths using the amplitude of the one or more path signals and the amplitude of the filter pass signals and to generate a calibration adjustment signal using a calculation result.

10. The apparatus of claim 9, further comprising:
    a modem to receive the calibration adjustment signal from the beamforming controller;
    one or more digital-to-analog (DA) converters to convert one or more output signals output from the modem into one or more analog signals; and
    one or more phase shifters to generate a phase of the one or more analog signals.

11. A method of calibrating a transmission path, the method comprising:
- separating, by one or more paths, one or more input signals input from an input terminal of one or more antennas;
- detecting amplitude of one or more path signals separated by the one or more paths;
- distributing any one of the one or more path signals;
- mixing a distributed distribution signal with the one or more path signals;
- removing a high-frequency component of a mixed signal mixed by the one or more mixers; and
- detecting amplitude of one or more filter pass signals with the high-frequency component removed.

12. The method of claim 11, further comprising:
- calculating a phase and amplitude of the one or more paths using the amplitude of the one or more path signals and the amplitude of the filter pass signals; and
- generating a calibration adjustment signal using a calculation result.

13. The method of claim 12, further comprising:
- converting one or more output signals into one or more analog signals; and
- generating a phase of the one or more analog signals.

14. The method of claim 11, further comprising:
- distributing the one or more input signal input from the one or more input terminal of the one or more antenna;
- separating, by the one or more paths, a first distribution signal distributed by from the one or more input signal;
- mixing a second distribution signal distributed among the one or more path signals with the one or more path signals.

15. The method of claim 14, further comprising:
- calculating a phase and amplitude of the one or more paths using the amplitude of the one or more path signals and the amplitude of the filter pass signals; and
- generating a calibration adjustment signal using a calculation result.

16. The method of claim 15, further comprising:
- receiving the calibration adjustment signal;
- converting the calibration adjustment signal into one or more analog signals; and
- generating a phase of the one or more analog signals.

* * * * *